3,299,020
OLEFIN-ALLYL HALIDE COPOLYMER
Edward Allen Hunter, Baton Rouge, and Clyde Lee
Aldridge, Baker, La., assignors to Esso Research and
Engineering Company, a corporation of Delaware
No Drawing. Filed Dec. 24, 1963, Ser. No. 333,208
9 Claims. (Cl. 260—87.5)

This invention relates to a process for polymerizing an olefin with an allyl halide. More particularly, it is concerned with a copolymer of isobutylene with methallyl chloride and is a continuation-in-part of application Serial No. 65,945, filed October 31, 1960 and now abandoned.

It is known to provide a butyl rubber copolymer of an olefin, e.g., isobutylene, and a multiolefin, e.g., isoprene, by utilizing a Friedel-Crafts catalyst, such as an aluminum halide catalyst dissolved in an alkyl halide solvent. This has been accomplished by incorporating the monomers into a reactor and subsequently adding the catalyst thereto at a low temperature between 0° and —200° C. However, it has been found that a similar procedure could not be employed to prepare a copolymer of an olefin, e.g., isobutylene, with an allyl halide, e.g., methallyl halide. The end product therefrom would have an extremely low molecular weight, e.g., 6000, and a relatively low intrinsic viscosity, e.g., 0.08. Therefore, this copolymer was unacceptable commercially due to these inferior physical properties.

It has now been discovered that a superior copolymer can be obtained by dissolving each monomer separately in solution, adding catalyst to the allyl halide solution, and subsequently admixing both solutions in a reactor zone. Thus, in accordance with one embodiment of the instant invention, a first solution is formed comprising an allyl halide, e.g., methallyl chloride; an alkyl halide, e.g., methylchloride; and a Friedel-Crafts catalyst, e.g., boron trifluoride. A second solution is prepared comprising an olefin, e.g., isobutylene, dissolved in an alkyl halide solvent, e.g., methyl chloride. The two solutions are subsequently combined in a reactor in conjunction with relatively low temperatures to provide a copolymer therefrom with a high molecular weight and high intrinsic viscosity.

Olefins within the purview of the present invention are $C_4$ to $C_7$ isoolefins, such as isobutylene and 3-methyl-1-butene; and $C_4$ to $C_{10}$ multiolefins, such as isoprene, butadiene, and piperylene. Allyl halides which are applicable herein have the general structure:

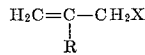

$$H_2C=C-CH_2X$$
$$\phantom{H_2C=}|$$
$$\phantom{H_2C=}R$$

wherein R is a hydrogen or a $C_1$ to $C_4$ alkyl group, and X is chlorine or bromine. This, therefore, includes allyl chloride, methallyl chloride, 2-chloromethyl butene-1, 2-chloromethyl pentene-1, and 2-chloromethyl hexene-1. The quantities of monomer which can be copolymerized vary over a wide range from 85 to 99 parts by weight, preferably 90 to 97 of olefin and 1 to 15 parts by weight, preferably 3 to 10 parts of allyl halide.

As stated heretofore, a first solution, hereafter designated as catalyst solution, is provided by mixing 5 to 25 parts of methallyl chloride, and the like, with 75 to 95 parts of a $C_1$ to $C_2$ alkyl halide solvent, e.g., methyl chloride, methylene dichloride, and ethyl chloride, at a temperature between —40 and —100° F. A Friedel-Crafts catalyst is added thereto until a strong color, generally yellow or red, is developed. Generally this catalyst will be used in amounts ranging from 1 to 25 parts and the color is adequately determined visually as well as by colorimetric or light absorptive methods. Friedel-Crafts catalysts are well known in the art and are described in Organic Chemistry, Fieser and Fieser (1956), pages 535 to 540, which are incorporated herein by reference. However, only certain of these catalysts give a strong color when added to the allyl halide. Those catalysts which are operable in this invention are anhydrous aluminum chloride, stannic chloride, boron trifluoride, and aluminum bromide.

A second solution is prepared herein comprising 10 to 35 parts of isobutylene, isoprene, or some other olefin mixed with 65 to 90 parts of the same alkyl halide, described above, at a temperature between —50 and —200° F. This solution is hereafter designated as the olefin solution. The catalyst and olefin solutions are then combined in a reaction zone by any one of various techniques. However, a suitable method is to mix the two solutions in a continuous mixing zone with the respective flows adjusted to give the desired monomer ratio in conjunction with agitation at a temperature between —50 and —200° F. The copolymer is subsequently recovered by standard methods. For example, the admixture of solutions with copolymer therein is flashed by pouring it into water at room temperature or above. The polymer which is precipitated therefrom is then water washed and held in boiling water to drive off residual monomers and solvent, and subsequently dried for 5 to 24 hours in a vacuum oven.

Thus, in accordance with the present invention, a new product is provided therefrom. This copolymer of an olefin with an allyl halide has a molecular weight of at least 75,000, preferably between 80,000 and 200,000. Furthermore, the instant copolymer has a relatively high intrinsic viscosity between 0.5 and 1.0 and contains at least about 0.5 wt. percent of chlorine or bromine. Therefore, this end product can be utilized commercially in the manufacture of tire inner liners, steam hoses, and conveyor belts.

The following examples are submitted to illustrate but not to limit this invention. Unless otherwise indicated, all parts and percentages in the specification are based upon weight.

*Example 1*

A 400 ml. beaker, packed in powdered Dry Ice was charged with 100 ml. of methyl chloride, 30 g. of isobutylene, and 2 g. of methallyl chloride and cooled to —100° F. A total of 0.293 grams of boron trifluoride in 5 equal portions was added thereto at intervals over a period of 19 minutes. After each of the first four catalyst additions, a sharp temperature rise occurred which indicated that the reaction was taking place. No temperature rise occurred after the last catalyst addition, indicating that reaction was complete. The final mixture was flashed by pouring, in conjunction with agitation, into 500 cc. of water at 72° C. A dead-white, tacky polymer was precipitated out. This product was water washed, held in boiling water for 15 minutes to drive off residual monomers and methyl chloride, and was subsequently dried overnight in a vacuum oven at 50° F. Copolymer A was the end product therefrom.

Copolymer B was provided in the following manner. Methallyl chloride, 2.25 g., thereof was mixed with 15 g. of methyl chloride at —50° F. Boron trifluoride was added thereto until a strong yellow color developed in which the end point was determined by visual inspection. This admixture which results therefrom was then cooled to about —70° F. to provide the catalyst solution. In a separate vessel, 30 grams of isobutylene were mixed with 100 ml. of methyl chloride at —90° F. to provide the isobutylene solution. One-half of the above catalyst solution was added to the aforementioned isobutylene solution in conjunction with stirring. A vigorous reaction took place instantly with the temperature rising to —31° F. in 1 minute. The mixture was then cooled to —80° F. and the remaining catalyst solution was added thereto with only a temperature rise to −60° F., indicating that the second portion of methallyl chloride underwent little or no reaction. Copolymer B was recovered and processed in a similar manner as described for Copolymer A. The physical properties of each are indicated herebelow:

| Copolymer | Mol. Wt. | Intrinsic Vis. | Wt. Percent Cl |
|---|---|---|---|
| A | 6,000 | 0.0851 | 0.34 |
| B | 92,000 | 0.5198 | 0.63 |

The above data demonstrate that a new copolymer has been provided by the instant invention which has a high molecular weight and high intrinsic viscosity, as well as a chlorine content of at least 0.5%. The data indicate that in Copolymer A, 14% of the methallyl chloride charged was utilized in the product (based on chlorine analysis). In comparison, over 50% of the methallyl chloride (from the first addition of catalyst solution which alone reacted) was included in Copolymer B.

*Example 2*

A 400 ml. beaker, packed in powdered Dry Ice, was charged with 100 mls. methyl chloride and 30 grams isoprene and cooled to −90° F.

A catalyst solution was prepared by mixing 15 cc. methyl chloride with 2.25 gms. of methallyl chloride and boron trifluoride was added until a strong yellow color developed. The temperature was held at −50° F. and the mixture was then cooled to −75° F.

The isoprene solution was agitated and one half the catalyst solution was added thereto. A vigorous reaction took place immediately with visible polymer formation as soon as the catalyst solution was added. The temperature rose rapidly to about −60° F.

The mixture was again cooled to −90° F. and the remaining catalyst solution was added. On this second catalyst addition, the temperature rose only to about −85° F. This indicated that the reaction was essentially complete on the first addition and, hence, that the methallyl chloride included in the second increment of catalyst solution did not undergo reaction.

The copolymer was recovered by essentially the same procedure outlined in Example 1. The product had the following physical properties:

Mol. wt.:     Wt. percent Cl
150,000 _____ 0.81

The chlorine catalyst indicated about 40% utilization of the methallyl chloride in the first addition of catalyst solution.

The nature of the present invention having been thus fully set forth, what is claimed as new and useful and desired to be secured by Letters Patent is:

1. A process which comprises forming a first solution comprising 5 to 25 parts by weight of an allyl halide, 75 to 95 parts by weight of an alkyl halide and adding thereto a Friedel-Crafts catalyst chosen from the group consisting of boron fluoride, aluminum chloride, aluminum bromide and stannic chloride, until a strong color develops; forming a second solution comprising 10 to 35 parts by weight of an olefin and 65 to 90 parts by weight of an alkyl halide; and reacting said second solution with said first solution at a temperature between −40 and −100° F. to provide a copolymer therefrom of high molecular weight and a high intrinsic viscosity.

2. The process according to claim 1 in which the olefin is selected from the group consisting of a $C_4$ to $C_7$ isoolefin and a $C_4$ to $C_{10}$ multiolefin.

3. The process according to claim 1 in which the allyl halide has the general structure

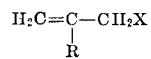

wherein R is selected from the group consisting of hydrogen and a $C_1$ to $C_4$ alkyl group and X is selected from the group consisting of chlorine and bromine.

4. The process according to claim 1 in which the alkyl halide is selected from the group consisting of methyl chloride, ethyl chloride, and methylene dichloride.

5. A process which comprises forming a first solution comprising 5 to 25 parts by weight of methallyl chloride and 75 to 95 parts by weight of methyl chloride and adding boron trifluoride until a strong yellow color develops; forming a second solution comprising 10 to 35 parts by weight of isobutylene and 65 to 90 parts by weight of methyl chloride; and reacting said second solution with said first solution at a temperature between −40 and −100° F. to provide a copolymer therefrom with high molecular weight and high intrinsic viscosity.

6. A composition of matter which comprises a copolymer of an allyl halide and an olefin; said copolymer having a molecular weight of 80,000 to 200,000, an intrinsic viscosity of 0.5 to 1.0, and a chlorine content greater than about 0.5%.

7. A composition of matter according to claim 6 in which the olefin is selected from the group consisting of a $C_4$ to $C_7$ isoolefin and a $C_4$ to $C_{10}$ multiolefin.

8. A composition of matter according to claim 7 in which the allyl halide has the general structure

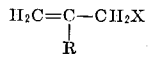

wherein R is selected from the group consisting of hydrogen and a $C_1$ to $C_4$ alkyl group and X is selected from the group consisting of chlorine and bromine.

9. A composition of matter which comprises a copolymer of methallyl chloride and isobutylene; said copolymer having a molecular weight of 80,000 to 200,000 and an intrinsic viscosity of 0.5 to 1.0 and a chlorine content greater than about 0.5%.

References Cited by the Examiner

UNITED STATES PATENTS 2,335,608    11/1943    Pings _____ 252—58
2,815,334    12/1957    Killey et al. _____ 260—85.3

JOSEPH L. SCHOFER, *Primary Examiner.*

J. A. DONAHUE, *Assistant Examiner.*